Figure 1:
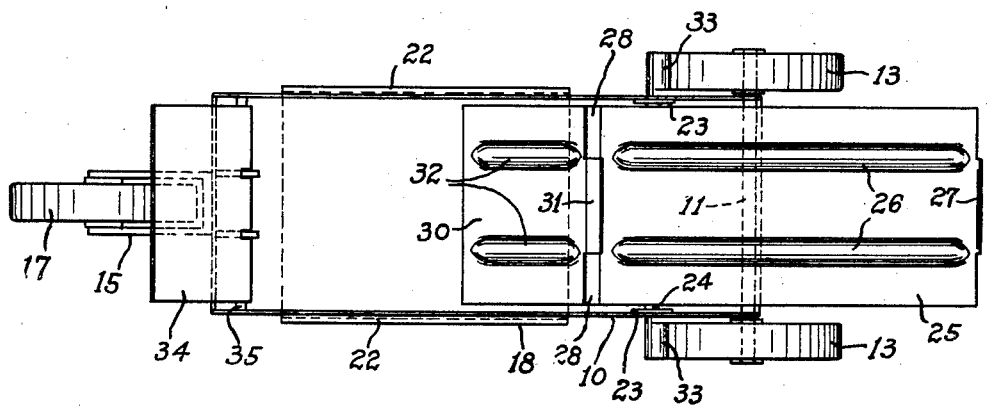

Jan. 14, 1947.  J. W. MERRIAM  2,414,383
FLAT TIRE CARRIAGE
Filed Aug. 27, 1945  3 Sheets-Sheet 1

Inventor
John W. Merriam
By Frease and Bisley
Attorneys

Inventor
John W. Merriam

Patented Jan. 14, 1947

2,414,383

UNITED STATES PATENT OFFICE 2,414,383

FLAT TIRE CARRIAGE

John W. Merriam, Jenkintown, Pa.

Application August 27, 1945, Serial No. 612,767

12 Claims. (Cl. 280—61)

The invention relates to wheeled carriages or carts designed for supporting a disabled wheel of an automobile or similar vehicle for transportation from the point where it becomes disabled to a point where service can be obtained, while the disabled wheel remains in place upon the vehicle.

An automobile or other self propelled, pneumatic tired vehicle is usually rendered inoperative when one of its tires becomes deflated, or "flat," either by a puncture, a slow leak in the tube or valve, or a blow out.

When such a pneumatic tire becomes deflated it is common practice to remove the flat tire from the vehicle and replace it with a spare tire which is ordinarily carried upon the vehicle for this purpose.

This requires the use of a jack to raise the disabled portion of the vehicle sufficiently to permit the wheel with the flat tire to be removed, and also the use of a tire wrench to remove the disabled wheel from the vehicle and remove the spare wheel and tire from the trunk or other position on the vehicle where it is normally stored.

The spare wheel is then placed upon the vehicle and securely fastened thereon by means of the tire wrench, the jack is operated to lower the newly placed wheel upon the ground, and then the jack is removed and replaced in the trunk and the disabled tire is placed upon the spare wheel rack in the trunk or other location and attached thereto by means of the tire wrench.

This requires some considerable time, especially by the average driver who is not usually experienced in such matters, and is a very disagreeable and dirty operation. Aside from the inconvenience and loss of time this is a hazardous undertaking, especially when it occurs on a much travelled road or street where the driver is endangered by passing traffic.

In an effort to eliminate the danger, inconvenience and loss of time incurred by the changing of tires on the highway, attempts have been made to provide wheeled trucks for supporting a disabled wheel while the vehicle is driven to a tire repair station or garage.

Such devices however have not come into general use, due probably to several objectionable features in their construction and operation, among which were the tendency of some of these trucks to push ahead of the wheel when loading it onto the truck.

In order to overcome this difficulty digging members are provided in some cases, but these were ineffective on hard surfaced highways.

Other unsuccessful attempts were made to prevent the wheeled truck from moving ahead of the disabled wheel by providing means for raising the wheels of the truck off of the ground during the loading operation.

It is an object of the present invention to provide a flat tire carriage which will eliminate the necessity of changing a tire on the highway, thus avoiding the danger, inconvenience and loss of time caused by such procedure, and which overcomes the objections and difficulties experienced with the use of such wheeled trucks which have been attempted in the past.

Another object is to provide such a device which will enable the driver of the vehicle to proceed without undue loss of time, to a service station without changing the deflated tire and without further damage to the tire which would be incident to continued operation under deflated condition.

A further object is to provide such a device which is of durable construction, and easily operated, even by a woman or small child.

A still further object is to provide a flat tire carriage of the character referred to which is so constructed that when a disabled tire is loaded thereon a brake will be automatically applied to the wheels of the carriage, preventing it from being pushed ahead of the disabled wheel.

Another object of the invention is to so construct such a device that when placed in position the disabled wheel can be easily run up onto the carriage and become automatically locked in position thereon, and that while so locked in position it will follow in the direction of the vehicle, being out of contact with the ground and suspended in such a manner that the walls of the tire will not be further damaged.

Figure 2:
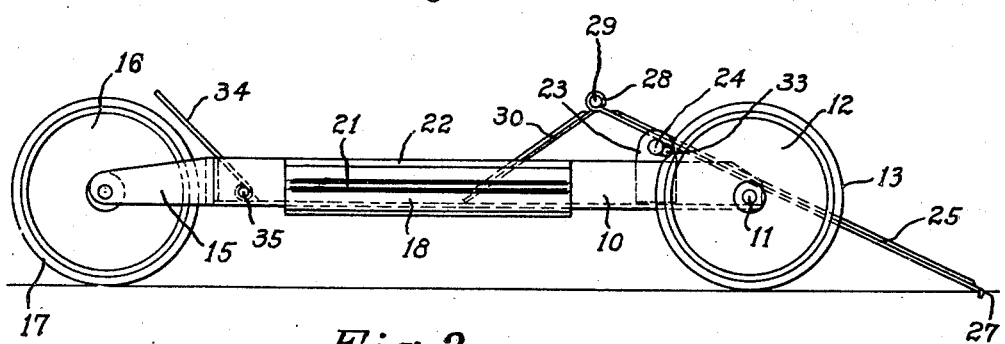
Figure 3:
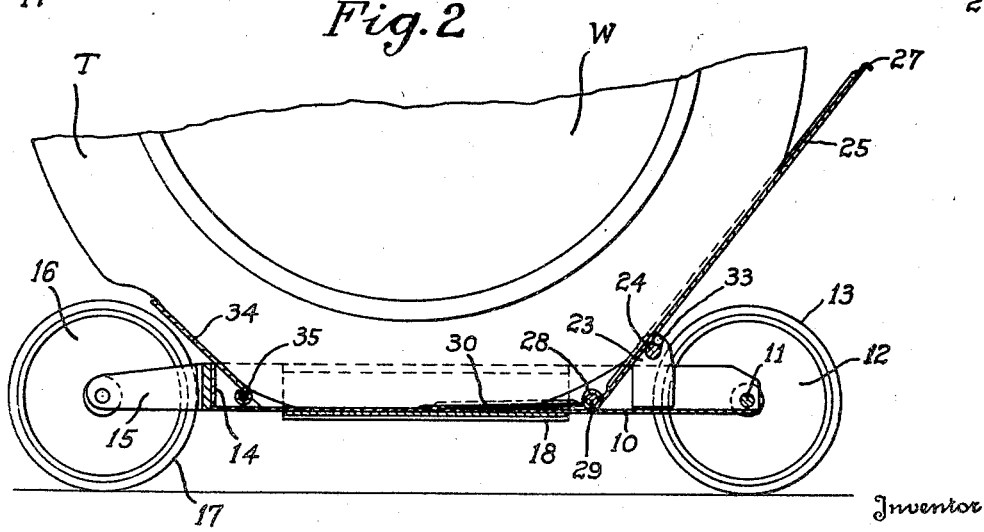
Figure 4:
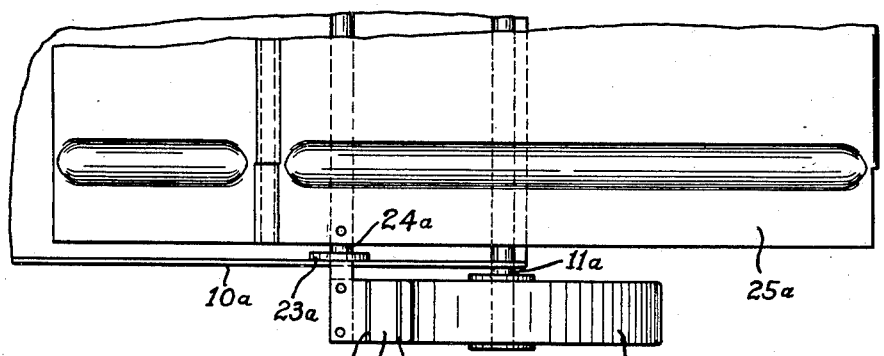
Figure 5:
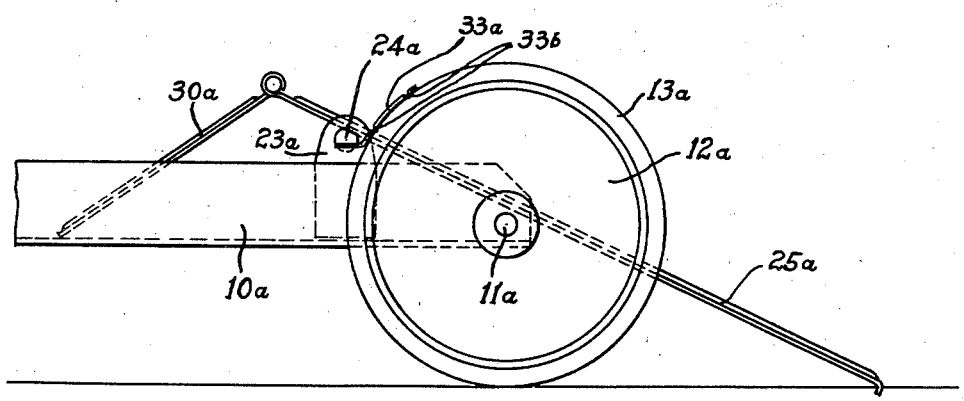
Figure 6:
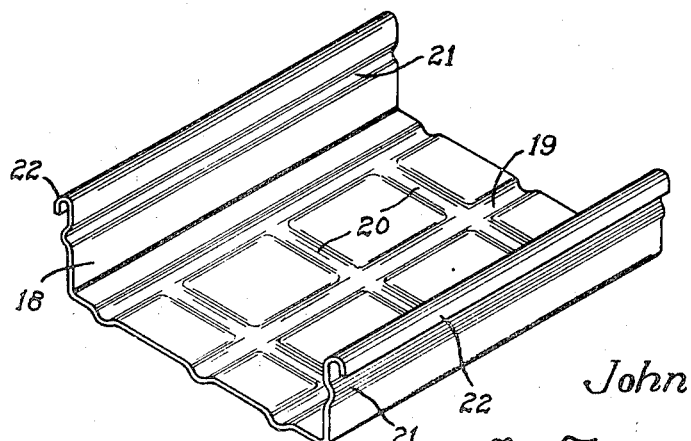
Figure 7:
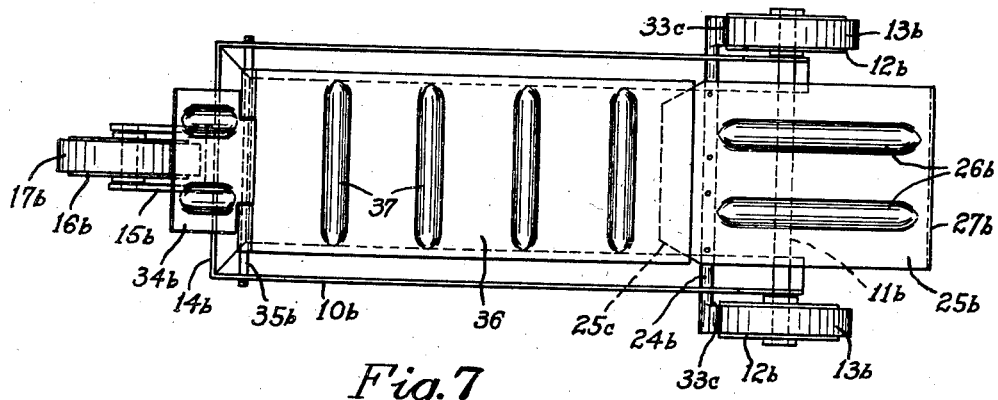
Figure 8:
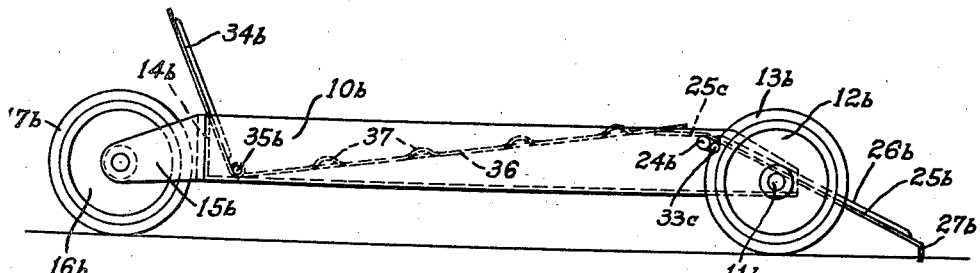
Figure 9:
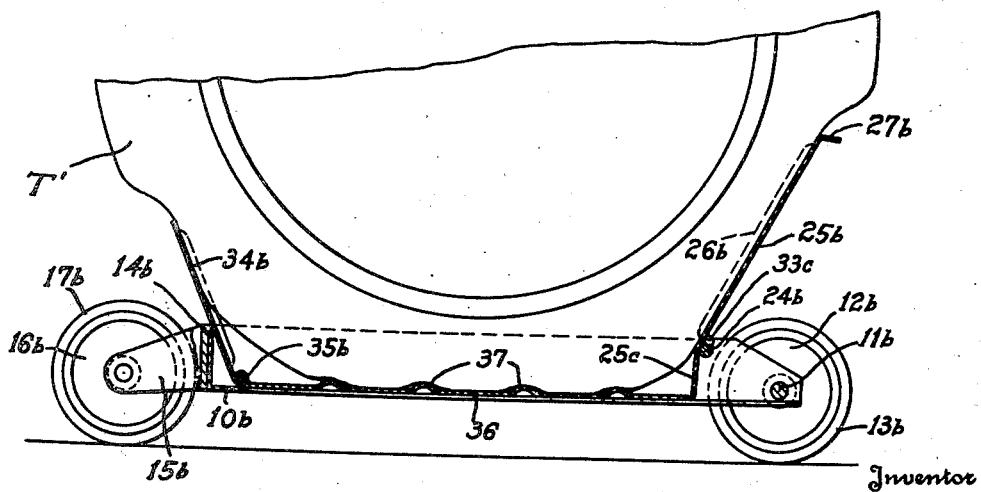

The above objects, together with others which will be apparent from the drawings and following description, or which may be later referred to, may be attained by constructing the improved flat tire carriage in the manner illustrated in the accompanying drawings, in which;

Figure 1 is a top plan view of a flat tire carriage embodying the invention, showing the device in position to receive a tire;

Fig. 2 a side elevation of the flat tire carriage in the position shown in Figure 1;

Fig. 3 a vertical, longitudinal section through the flat tire carriage showing a disabled tire cradled therein;

Fig. 4 a fragmentary top plan view, on an enlarged scale, of a portion of a flat tire carriage showing a modified form of brake device thereon;

Fig. 5 a fragmentary side elevation showing the brake device illustrated in Fig. 4;

Fig. 6 a detached, perspective view of the reinforcing body portion of the device;

Fig. 7 a top plan view of another modification of the flat tire carriage, showing the same in position to receive a tire;

Fig. 8 a side elevation of the flat tire carriage shown in the same position as Fig. 7, and Fig. 9 a vertical longitudinal sectional view through the carriage shown in Figs. 7 and 8, showing a disabled tire cradled therein.

The flat tire carriage comprises generally a channel shaped body portion 10, having an axle 11 at one end upon which is mounted a pair of wheels 12 which are preferably provided with rubber tires 13.

The other end of the body portion 10 may be closed by an end wall 14 to which is rigidly attached a fork 15 within which is journalled a wheel 16 also preferably provided with a rubber tire 17, whereby the carriage has a three-point suspension upon said wheels.

The body 10 of the carriage is preferably strengthened by the channel shaped reinforcing member 18, which may be provided with longitudinal and transverse corrugations 19 and 20 on its bottom wall and longitudinal corrugations 21 in its side walls, beads 22 being preferably formed at the upper edges of the side walls. This reinforcing member may be welded or otherwise rigidly attached to the body portion 10 of the carriage.

A pair of upwardly disposed ears 23 may be formed upon or rigidly attached to the side walls of the body member 10 adjacent to the wheels 12, and a shaft or rod 24 is journalled in said ears.

A ramp 25, which may be formed of a heavy sheet or plate of metal, is fixedly attached to the top of the shaft or rod 24 as by welding, or the like, at a point spaced from the inner end of the ramp.

For the purpose of strengthening and reinforcing the ramp 25 longitudinal corrugations 26 may be formed therein. The outer end of the ramp 25 may be rounded and downturned as indicated at 27 so as to provide a smooth surface onto which the disabled wheel may be driven.

Hinge knuckles 28 are formed upon the inner end of the ramp 25 and receive a hinge pin 29 for hingedly connecting the plate 30 which is provided with a hinge knuckle 31 also attached to the hinge pin 29. The hinged plate 30 may also be longitudinally corrugated as at 32 in order to strengthen and reinforce the same.

For the purpose of providing a brake for preventing movement of the wheels of the carriage while a disabled tire is being loaded thereon, cam like projections 33 are provided upon the ends of the shaft 24 and adapted to bite into the rubber tires 13 of the wheels 12 and lock the wheels against movement when the ramp is in the position shown in Figs. 1 and 2.

At the other end of the body 10, a plate 34 is hingedly mounted upon a rod 35, located through the side walls of the body member 10 near the bottom thereof at a point spaced from the end wall 14, so that the plate 34 may rest upon the upper edge of said end wall as shown in the drawings.

When it is desired to load a disabled tire upon the carriage the plate 34 is moved to the position shown in the drawings and the ramp 25 is tilted to the position shown in Figs. 1 and 2 and the carriage moved to a position in front of the disabled wheel and in alignment therewith, the lower or outer end of the ramp 25 being directed toward the disabled tire.

The automobile is then driven slowly toward the carriage, rolling the disabled wheel onto the ramp 25, the cam locking projections 33 being held in tight engagement with the tires 13 of the wheels 12 preventing the carriage from moving away from the disabled wheel.

As the wheel with the flat tire thereon passes over the shaft 24 the ramp 25 will be tilted upon said shaft to the position shown in Fig. 3, the flate tire T upon the disabled wheel W being received upon the bottom of the body member 10 of the carriage and against the upturned ramp 25 and plate 34 as shown in Fig. 3, thus holding the disabled wheel locked in position upon the flat tire carriage so that the automobile may be driven to a repair station without further damage to the tire.

In Figs. 4 and 5 is shown a modified form of brake mechanism, the remainder of the flat tire carriage being the same as shown in Figs. 1 to 3, and above described, and comprising generally the channel shaped body portion 10a having the axle 11a journalled through one end portion thereof upon which are mounted the wheels 12a provided with rubber tires 13a.

The ears 23a are formed or mounted upon the side walls of the channel body 10a and the shaft or rod 24a is journalled therein and has a cam locking projection in the form of an arcuate sheet metal flange 33a fixed upon each end and provided with the ribs 33b formed thereon for biting into the adjacent tire 13a as best shown in Fig. 5.

The ramp 25a and hinged plate 30a are the same as above described in reference to Figs. 1 to 3. As the ramp 25a is placed in operative position as shown in Fig. 5, the locking member 33a will be moved into contact with the tires 13a, the ribs 33b of the locking member biting into the tires and preventing rotation of the wheels while the disabled tire is being loaded onto the ramp in the manner above described.

In Figs. 7, 8 and 9 is shown another modification of the flat tire carriage in which the body 10b, of generally channel shape, is provided at one end with an axle 11b upon which is mounted a pair of wheels 12b preferably provided with rubber tires 13b.

The other end of the body may be closed by an end wall 14b to which is rigidly attached a fork 15b within which is journalled a wheel 16b, also preferably provided with a rubber tire 17b, whereby the carriage has a three-point suspension upon said wheels.

A shaft or rod 24b is journalled through the side walls of the body 10b, at a point near the peripheries of the wheels 12b, and a ramp 25b is fixedly attached to the top of said rod or shaft, as by welding or the like, at a point spaced from the inner end of the ramp.

The inwardly disposed extension 25c of the ramp is preferably disposed at a slight angle to the main body of the ramp, which may be provided with longitudinal corrugations 26b for strengthening and reinforcing the same. The outer end of the ramp may be downturned, as indicated at 27b, in order to provide a smooth surface onto which the disabled wheel may be driven.

For the purpose of providing a brake for preventing movement of the wheels of the carriage while a tire is being loaded thereon, cam-like projections 33c are provided upon the ends of the shaft 24b and adapted to bite into the rubber tires 13b of the wheels 12b and lock the same against movement when the ramp is in the loading position as shown in Figs. 7 and 8.

An end plate 34b is hingedly mounted upon a rod 35b located through the other end portion of the side walls of the body member 10, adjacent to the bottom thereof, at a point slightly spaced from the end wall 14b, so that the plate 34b may rest upon the upper edge of said end wall as shown in the drawings.

A bottom plate 36, preferably provided with transverse corrugations 37 is hingedly mounted at one end upon the rod 35b, the free end of said plate being adapted to rest upon the angular inner extension 25c of the ramp when the parts are in the loading position shown in Figs. 7 and 8, said bottom plate 36 being adapted to rest upon the bottom of the body member 10b when a disabled tire is loaded upon the carriage as shown in Fig. 9.

A disabled tire may be loaded upon the carriage in the manner above described, and as the tire passes over the shaft 24b, the ramp 25b will be tilted up to the position shown in Fig. 3, disengaging the cam-like projections 33c from the tires of the wheels 12b and permitting the bottom plate 36 to seat upon the bottom of the body of the carriage, thus holding the disabled flat tire T' locked in position upon the carriage between the ramp 25b and the hinged plate 34b so that the automobile may be driven to a repair station without further damage to the tire.

I claim:

1. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position.

2. A flat tire carriage comprising a channel-shape body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position.

3. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position, and a plate hinged to the inner end of the ramp and having its free end slidable upon the bottom of the body member.

4. A flat tire carriage comprising a body portion, wheels journalled upon the body portion, rubber tires upon the wheels, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the tires of the adjacent wheels and prevent movement thereof when the ramp is tilted to the first named position.

5. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position, and means for moving said locking projections out of contact with the wheels as the ramp is tilted in the opposite direction.

6. A flat tire carriage comprising a body portion, wheels journalled upon the body portion, rubber tires upon the wheels, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the tires of the adjacent wheels and prevent movement thereof when the ramp is tilted to the first named position, and means for moving said locking projections out of contact with the tires as the ramp is tilted in the opposite direction.

7. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position, said ramp forming an anchor for the disabled tire when tilted to the second named position.

8. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position, and an inclined plate at the other end of the body portion, said inclined plate together with said ramp forming anchors for the disabled tire when the ramp is tilted to the second named position.

9. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and cam locking projections upon the shaft arranged to frictionally engage the adjacent wheels and prevent movement thereof when the ramp is tilted to the first named position.

10. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and ribbed locking flanges upon the shaft arranged to frictionally engage the adjacent wheels and prevent movement thereof when the ramp is tilted to the first named position.

11. A flat tire carriage comprising a channel shape body portion open at one end, wheels journaled upon the body portion, a ramp pivoted upon the body portion adjacent to the open end thereof, an inwardly disposed extension upon the ramp, a bottom plate pivoted at the bottom of the body near the opposite end thereof, the free end of the bottom plate being arranged to rest upon the inwardly disposed extension of the ramp when the ramp is tilted with its outer end upon the ground for loading a disabled tire onto the carriage and to rest upon the bottom of the body when the ramp is tilted in the opposite direction by the loading of a disabled tire on the carriage, and an end plate pivoted within the body adjacent to the pivot point of the bottom plate.

12. A flat tire carriage comprising a body portion, wheels journalled upon the body portion, a shaft journalled in the body portion adjacent to certain of the wheels, a ramp fixed at a point intermediate its ends upon said shaft, said ramp being arranged to be tilted with its outer end upon the ground for loading a disabled tire onto the carriage and to be tilted in the opposite direction when the tire is loaded upon the carriage, and locking projections upon the shaft arranged to frictionally engage the adjacent wheels and prevent movement thereof when the ramp is tilted to the first named position, an inwardly disposed extension upon the ramp, a bottom plate pivoted at the bottom of the body near the opposite end thereof, the free end of the bottom plate being arranged to rest upon the inwardly disposed extension of the ramp when the ramp is tilted with its outer end upon the ground for loading a disabled tire onto the carriage and to rest upon the bottom of the body when the ramp is tilted in the opposite direction by the loading of a disabled tire on the carriage.

JOHN W. MERRIAM.